United States Patent [19]

Williams et al.

[11] 4,044,738
[45] Aug. 30, 1977

[54] POLLUTION CONTROL ARRANGEMENTS FOR ENGINES

[75] Inventors: Malcolm Williams, Solihull; Christopher Robin Jones, Alcester, both of England

[73] Assignee: Lucas Electrical Company Limited, Birmingham, England

[21] Appl. No.: 584,167

[22] Filed: June 5, 1975

[30] Foreign Application Priority Data

June 7, 1974 United Kingdom ............... 25304/74

[51] Int. Cl.² .......................................... F02M 25/06
[52] U.S. Cl. ................................................. 123/119 A
[58] Field of Search ..................................... 123/119 A

[56] References Cited

U.S. PATENT DOCUMENTS

| | | |
|---|---|---|
| 3,636,934 | 1/1972 | Nakasima et al. ............... 123/119 A |
| 3,646,764 | 3/1972 | Nakajima et al. ............... 123/119 A |
| 3,673,993 | 7/1972 | Nakajima et al. ............... 123/119 A |
| 3,799,133 | 3/1974 | Frank ............................. 123/119 A |
| 3,807,376 | 4/1974 | Glockler et al. ................. 123/119 A |
| 3,817,232 | 6/1974 | Nakajima et al. ............... 123/119 A |
| 3,915,134 | 10/1975 | Young et al. .................... 123/119 A |

*Primary Examiner*—Wendell E. Burns
*Attorney, Agent, or Firm*—Holman & Stern

[57] ABSTRACT

An engine exhaust recirculating valve is operated by a solenoid. The valve is normally open, but has an electronic control circuit, including an engine speed transducer, which energizes the solenoid to close the valve when the engine speed is above a predetermined level.

6 Claims, 1 Drawing Figure

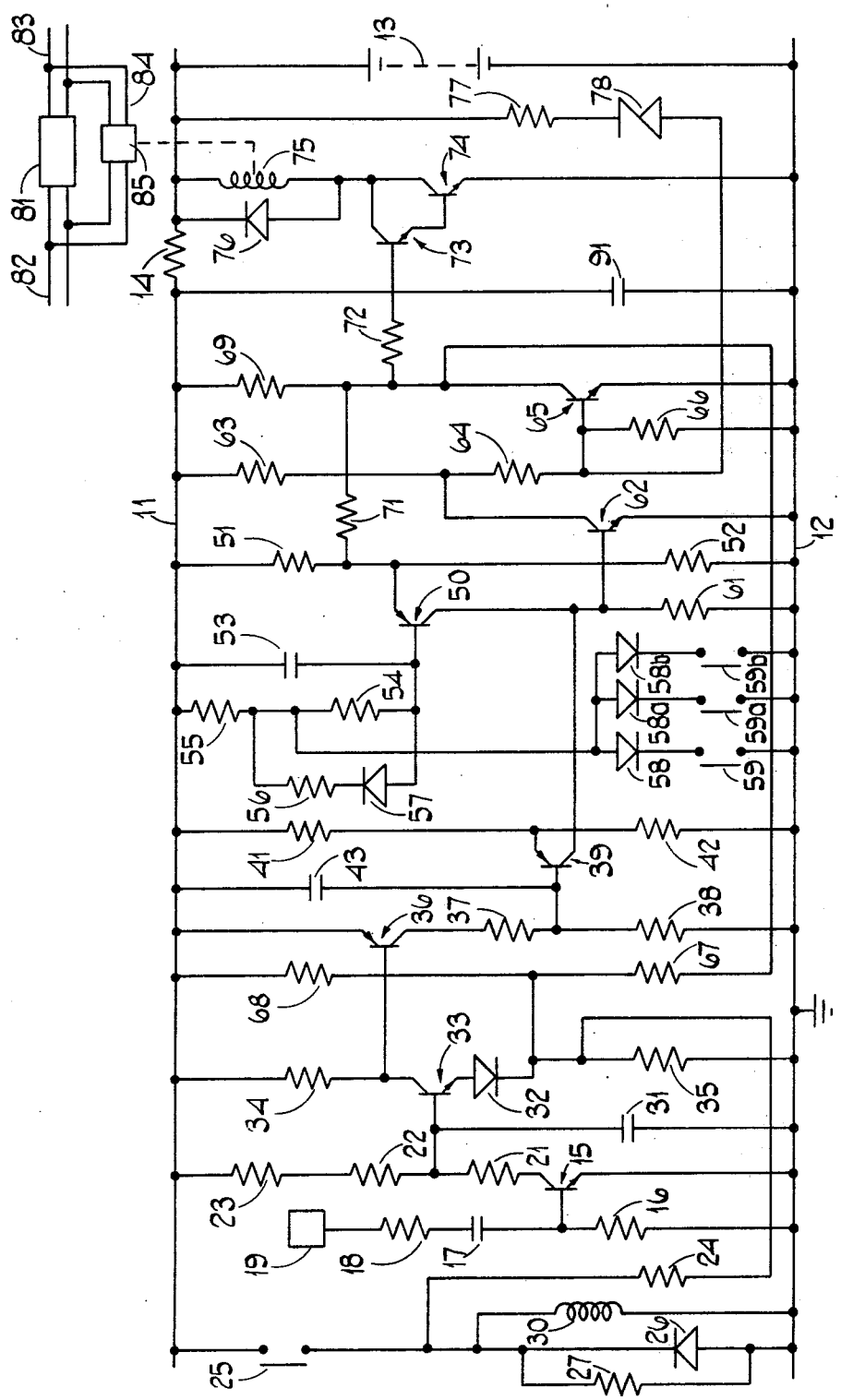

POLLUTION CONTROL ARRANGEMENTS FOR ENGINES

This invention relates to pollution control arrangements for engines.

An arrangement according to the invention includes a valve by way of which exhaust gases can be recirculated, a solenoid which when energised closes the valve, and electronic control means for energising the solenoid when the engine speed is above a predetermined level.

Preferably, the solenoid is also energised when any one of the following conditions is fulfilled; (a) the engine throttle is closed; (b) the engine throttle is open beyond a predetermined position; (c) the engine temperature is below a predetermined level.

The accompanying drawing is a circuit diagram illustrating one example of the invention.

Referring to the drawing, there are provided positive and negative supply lines 11, 12, bridged by a capacitor 91, the line 12 being earthed and connected to the negative terminal of the vehicle battery 13, the line 11 being connected through a resistor 14 to the positive terminal of the battery 13. An n-p-n transistor 15 has its emitter connected to the line 12 and its base connected through a resistor 16 to the line 12, and further connected through a capacitor 17 and a resistor 18 in series to a transducer 19 which produces an alternating output at a frequency proportional to the speed of the engine of the vehicle. The collector of the transistor 15 is connected to the line 11 through resistors 21, 22, 23 in series. Furthermore, the vehecle power transmission system incorporates an overdrive mechanism with an overdrive switch 25 and a solenoid 30 connected in series between the lines 11, 12, the arrangement being such that whenever the switch 25 is closed, the overdrive solenoid 30 is energised to engage the overdrive mechanism. The solenoid 30 is bridged by a free wheel diode 26 and a resistor 27 in parallel.

The junction of the resistors 21, 22 is connected through a capacitor 31 to the line 12, and to the base of an n-p-n transistor 33 having its collector connected through a resistor 34 to the line 11 and its emitter connected through a diode 32 and a resistor 35 in series to the line 12, the junction of the diode 32 and resistor 35 being connected through a resistor 24 to the junction of the switch 25 and solenoid 30. The collector of the transistor 33 is further connected to the base of a p-n-p transistor 36, the emitter of which is connected to the line 11 and the collector of which is connected through resistors 37, 38 in series to the line 12, the junction of the resistor 37, 38 being connected to the base of a p-n-p transistor 39 the emitter of which is connected to the junction of a pair of resistors 41, 42 connected between the lines 11, 12, and the base of which is connected through a capacitor 43 to the line 11.

The circuit further includes a p-n-p transistor 50 the emitter of which is connected to the junction of a pair of resistors 51, 52 bridging the lines 11, 12, and the collector of which is connected to the collector of the transistor 39. The base of the transistor 50 is connected to the line 11 through a capacitor 53 bridged by a pair of resistors 54, 55 in series, the resistor 54 being itself bridged by a resistor 56 and a diode 57 in series. The junction of the resistors 54, 55 is connected to the line 12 through a diode 58 and a normally open switch 59 in series. The diode 58 and switch 59 are bridged by two series paths, one containing a diode 58a and a switch 59a, and the other containing a diode 58b and a switch 59b.

The collector of the transistor 50 is further connected through a resistor 61 to the line 12, and is also connected to the base of an n-p-n transistor 62 having its emitter connected to the line 12 and its collector connected through a resistor 63 to the line 11, and through a resistor 64 to the base of an n-p-n transistor 65. The transistor 65 has its base connected through a resistor 66 to the line 12 and its collector connected through a resistor 67 and a resistor 68 in series to the line 11, the junction of the resistor 67, 68 being connected to the emitter of the transistor 33. The collector of the transistor 65 is further connected through a resistor 69 to the line 11, through a resistor 71 to the emitter of the transistor 50, and through a resistor 72 to the base of an n-p-n transistor 73 which together with a transistor 74 forms a Darlington pair with the emitter of the transistor 74 connected to the line 12 and the collectors of the transistors 73, 74 connected through a solenoid 75 to the positive terminal of the battery 13. The solenoid is bridged by a freewheel diode 76. Finally, the positive terminal of the battery is connected through a resistor 77 and a Zener diode 78 in series to the base of the transistor 65.

The engine of the vehicle is indicated diagrammatically at 81 with its inlet at 82 and its exhaust at 83. There is a recirculating path between the outlet and inlet indicated at 84, and in this path is a valve 85 which is normally open, but which when the solenoid 75 is energised is closed. When the vehicle is in use, then under certain selected engine conditions to be described the solenoid 75 will be energized and the valve will be closed. At all other times, the valve 85 will be open.

In order to understand the operation of the circuit, the transistor 39 and all the components to the left of the transistor 39 can for the moment be ignored. Each of the switches 59, 59a, 59b is normally open, and when all these switches are open the transistor 50 is off, and so the transistor 62 is off. Current flowing through the resistor 63 and the resistor 64 turns on the transistor 65, and so the Darlington pair 73, 74 is off and the solenoid 75 is not energised, so that the valve 85 is open.

The switch 59 is sensitive to the engine water temperature. When the engine water is cold, the switch 59 closes and provides a base path for the transistor 50, which turns on to provide base current to the transistor 62, which conducts to remove base current from the transistor 65, so that current can now flow through the resistors 69 and 72 to turn on the Darlington pair 73, 74 and energise the solenoid 75 and close the valve 84. When the switch 59 opens again, the solenoid 75 will be de-energised. Exactly the same procedure takes place if any one or more of the switches 59a, 59b, is closed. Both the switches 59a and 59b are operable by the accelerator pedal. The switch 59a closes when the accelerator pedal is released. The switch 59b closes when the accelerator pedal is depressed beyond a predetermined point, which is selected to be closed to its maximum depression. The purpose of the Zener diode 78 is to turn off the transistor 73 and 74 if an excessive voltage occurs, so protecting these transistors. The capacitor 91 smooths the voltage between the lines 11, 12.

The purpose of the transistor 39 and the components to the left thereof is to energise the solenoid 75 when the engine rotational speed is above a predetermined value. The alternating signal from the transducer 19 turns the transistor 15 on and off, and so permits charging and discharging of the capacitor 31. Below a predetermined engine speed, the capacitor 31 has time to charge to a level such that the transistor 33 is turned on, the transistor 36 is on, and the transistor 39 is off. The transistor 39 has exactly the same effect as the transistor 50, and so when it is off, the transistor 62 is off (assuming of course that the transistor 50 is off at the time). At engine speeds above the predetermined level, however, the transistor 15 is turned on and off so quickly that the capacitor 31 does not have time to charge sufficiently to turn on the transistor 33. As a result, the transistors 33 and 36 are off and the transistor 39 is on. When the transistor 39 is on, the transistor 62 is turned on to turn off the transistor 65 and permit conduction of the transistor 73, 74 to energise the solenoid 75, in exactly the same way as when the transistor 50 conducts.

The purpose of the capacitor 53, the resistor 54, 55 and 56 and the diode 57 is to set a minimum time for which the transistor 50 remains on once it conducts. This gives the solenoid 75 time to operate properly if one of the switches 59, 59a, 59b closes and then opens immediately. An equivalent arrangement is not necessary when the engine speed exceeds the predetermined value, because there is a finite time taken for the engine speed to fall again. The resistor 67 provides feedback to the emitter of the transistor 33 to provide speed hysteresis, so preventing spurious operation. This is achieved by increasing the voltage to which the capacitor 31 must be charged to turn on the transistor 32, so reducing the engine speed at which the circuit will switch.

The diode 57 and resistor 56 give a non-linear time delay. The resistor 56 has a much lower resistance than the resistor 54, and so when the switch 59 is closed, the transistor 50 is brought into conduction faster than it is turned off when the switch 59 is opened.

When the overdrive solenoid 30 is energised by closing the switch 25, current flows in the resistor 24 to raise the voltage at which the transistor 33 will conduct, so reducing the speed at which the circuit will switch in much the same way as the feedback connection through the resistor 67 operates. The circuit shown is provided whether or not the solenoid 30 is to be fitted on a particular vehicle. If the solenoid 30 is omitted, then the resistor 27 serves to couple the upper end of the resistor 24 to the line 12, so that the circuit effectively operates as if the resistor 24 were not present.

The diode 32 protects the base emitter of the transistor 33.

We claim:

1. A pollution control arrangement for an engine including a valve by way of which exhaust gases can be recirculated, a solenoid which when energized closes said valve, and electronic control means energizing said solenoid when the engine speed is above a predetermined level, said control means comprising:
   an engine speed transducer for producing an a.c. signal of frequency proportional to the engine speed; and
   means sensitive to said frequency of said a.c. signal for continuously energizing said solenoid when the frequency of said signal is above a predetermined level.

2. A pollution control arrangement as claimed in claim 1 in which said frequency sensitive means includes a transistor biased off and having its base a.c. coupled to the transducer so that said transistor is turned on and off at a rate determined by said frequency, a capacitor having a charging path and a discharge path controlled by said transistor so that the amplitude of the signal on said capacitor decreases with increasing frequency and means sensitive to the amplitude of the signal on said capacitor for energising the solenoid.

3. A pollution control arrangement as claimed in claim 2 in which said amplitude means includes a switching circuit operable to energise the solenoid when the amplitude is less than a first determined value and including a feedback connection such that when the amplitude increases whilst the solenoid is energised the switching circuit operates to de-energised when the amplitude exceeds a second and higher predetermined value.

4. A pollution control arrangement as claimed in claim 1 further comprising means for energising the solenoid when any one of the following conditions is fulfilled:
   a. the engine throttle is closed.
   b. the engine throttle is open beyond a predetermined position.
   c. the engine temperature is below a predetermined level.

5. A pollution control arrangement as claimed in claim 4 including normally open switches sensitive to the three conditions respectively and connected in parallel to the control means to energise the solenoid when any one of the switches closes.

6. A pollution control arrangement as claimed in claim 5 in which the control means includes an input circuit activated by said switches and providing an output to energize the solenoid for a predetermined minimum time if one of the switches is closed. momentarily.

* * * * *